United States Patent [19]

Krishnan et al.

[11] Patent Number: 4,471,104
[45] Date of Patent: Sep. 11, 1984

[54] PROCESS FOR THE PREPARATION OF POLYCARBONATES HAVING SULFONANILIDE TERMINAL GROUPS

[75] Inventors: Sivaram Krishnan, New Martinsville, W. Va.; Wolfgang Cohnen, Leverkusen, Fed. Rep. of Germany; Dieter Neuray, New Martinsville, W. Va.

[73] Assignee: Bayer Aktiengesellschaft, Leverkusen, Fed. Rep. of Germany

[21] Appl. No.: 439,091

[22] Filed: Nov. 4, 1982

[30] Foreign Application Priority Data

Dec. 18, 1981 [DE] Fed. Rep. of Germany ....... 3150273

[51] Int. Cl.$^3$ ............................................. C08G 63/62
[52] U.S. Cl. .................................. 528/199; 528/196; 528/198; 528/204
[58] Field of Search ................ 528/199, 198, 196, 204

[56] References Cited

U.S. PATENT DOCUMENTS

| | | | |
|---|---|---|---|
| 3,186,961 | 6/1965 | Sears | 260/30.4 |
| 4,041,003 | 8/1977 | Adelmann et al. | 260/30.8 R |
| 4,188,475 | 2/1980 | Margotte | 528/175 |

FOREIGN PATENT DOCUMENTS 2000515 1/1979 United Kingdom .

OTHER PUBLICATIONS

Hackh's Chemical Dictionary, 4th Edition, pp. 47 and 646.

*Primary Examiner*—Harold D. Anderson
*Attorney, Agent, or Firm*—Gene Harsh; Lawrence S. Pope; Aron Preis

[57] ABSTRACT

The present invention relates to the preparation of aromatic polycarbonates by the known two-phase interface process, from diphenols characterized in that aromatic sulfonanilides are used as chain terminators in amounts of about 2 mol % to 20 mol %, preferably in amounts of about 2.5 mol % to 10 mol %, relative to mols of diphenols employed. In addition, the present invention relates to the aromatic polycarbonates obtainable by the process according to the invention. The products of this invention have been found to have better self extinguishing property compared to polycarbonates without sulfonamide end groups.

8 Claims, No Drawings

PROCESS FOR THE PREPARATION OF POLYCARBONATES HAVING SULFONANILIDE TERMINAL GROUPS

SUMMARY OF THE INVENTION

The present invention relates to the preparation of aromatic polycarbonates having $\overline{M}w$ between 10,000 and 100,000, by the known two-phase interface process from diphenols characterized in that aromatic sulfonanilides are used as chain terminators in amounts of about 2 mol % to 20 mol %, preferably in amounts of about 2.5 mol % to 10 mol %, relative to moles of diphenols. In addition, the present invention relates to the aromatic polycarbonates obtainable by the process according to the invention. The products of this invention have found to possess better self extinguishing property compared to polycarbonates without sulfonamide chain terminators.

DETAILED DESCRIPTION OF THE INVENTION

Improvements in the flame retardant properties of aromatic thermoplastic polycarbonates have already been attempted in various ways, as by the incorporation of sulfur bearing end groups. According to U.S. Pat. No. 4,188,475 or European Pat. No. 396 or German Published specification No. 2732 556 (Le A 18 230) polycarbonates with arylsulfonyl-endgroups are known, but these do not impart sufficient flame retardancy to polycarbonate needed for some purposes because they have only V-2 (according to UL, subject 94, thickness 1/16"=1.6 mm). Unobviously the polycarbonates according our instant invention having sulfonanilide end groups have V-1 (according the same flame measurement).

Another advantage over flame retardancy according prior art is avoiding corrosion at high temperatures.

According DE-OS No. 2506 726 (Le A 16 235) it is known to add perfluoro-alkane sulfonamides to polycarbonates as mold release agents. Any effect on flame retardancy is not mentioned.

In principle, it is possible to use all aromatic sulfonanilides for the process according to the invention; thus for example substituted and unsubstituted aromatic sulfonanilides, substituted and unsubstituted naphthalene sulfonanilides, substituted and unsubstituted anthracene sulfonanilides substituted and unsubstituted hetero aromatic sulfonanilides.

In this connection, alkylaryl or halogen for example are to be understood as substituents.

Benzene sulfonanilides which are preferably suitable according to the invention are those of formula I

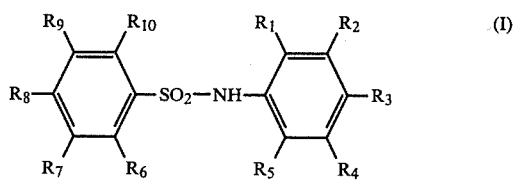

wherein $R_1$–$R_{10}$ are identical or different and are H, alkyl preferably $C_1$–$C_{18}$, cycloalkyl, preferably $C_5$–$C_6$, aryl, preferably $C_6$–$C_{16}$, or cyano, preferably 2-3 cyano substituents pro aromatic ring, or halogen, preferably chlorine or bromine.

Examples of anilides which are for example suitable according to the invention are N-Phenyl benzene sulfonamide (Benzene-sulfonanilide), N-(p-methylphenyl) benzene sulfonamide, N-(p-methylphenyl) p-toluyl sulfonamide, N-(2,4-dimethylmethyl) benzene sulfonamide, N-(2,4-dichlorophenyl)benzene sulfonamide, N-(2,4,6-trichlorophenyl)benzene sulfonamide, N-phenyl-2,4-6-trichlorophenylsulfonamide, N-(p-dodecylphenyl) benzene sulfonamide, N-(3-cyanophenyl) benzene sulfonamide, N-(Naphthyl)benzene sulfonamide and N-(Phenyl)napthylene sulfonamide.

Other variation of substituents in the phenyl ring adjacent to the sulfone groups and in the phenyl ring adjacent to the NH-group are possible to be used as chain regular according to this invention.

The following aromatic sulfonanilides are most preferably used: N-phenyl benzene sulfonamide (benzenesulfonanlide), N-(p-methylphenyl) benzene sulfonamide and N-phenyl 2,4,6-trichlorbenzene sulfonamide.

The aromatic polycarbonates of the present invention preferably suitable can be characterized by the general formula (II)

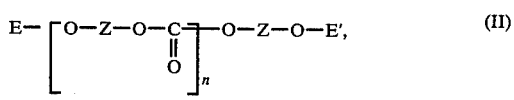

wherein E and E' are the same or different and are radicals of the formula (III)

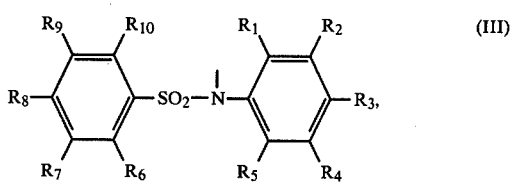

wherein $R_1$ to $R_{10}$ correspond to those of formula (I).

In (II) Z represents a divalent aromatic radical, preferably with 6 to 30 carbon atoms, derived from a compound of the formula (IV)

and n is the degree of polymerisation which results from a weight average molecular weight $Mw$ of the aromatic polycarbonate of from about 10,000 to 100,000.

The preparation of polycarbonates by the interface process is known. The polycarbonates are obtained by reacting diphenols, in particular dihydroxy diarylalkanes or -cycloalkanes with phosgene, those dihydroxy diarylalkanes and cycloalkanes in which the aryl radicals are substituted in the O-position to the phenolic hydroxyl groups also being suitable in addition to unsubstituted dihydroxy diaryl-alkanes and -cycloalkanes. The polycarbonates prepared by the two-phase interface process can also be branched.

The known catalysts such as triethylamine and the customary solvents, reaction temperatures and amounts of alkali for the two-phase interface process are likewise known such as those taught in the book "Chemistry and Physics of Polycarbonates" by Hermann Schnell, Interscience Publishers, New York 1964.

The polycarbonates according to the invention may have weight average molecular weights ($Mw$=weight average) between about 10,000 and 100,000 preferably between 20,000 and 80,000 which can be determined from the relative viscosity of the polycarbonates (measured in CH₂Cl₂ at 25° C. and at a concentration of about 0.5% by weight). Polycarbonates from halogen-free diphenols are preferred.

Examples of suitable diphenols are hydroquinone, resorcinol, 4,4'-dihydroxydiphenyl, bis(hydroxyphenyl)alkanes such as for example $C_1$–$C_8$ alkylene and $C_2$–$C_8$ alkylidene-bisphenols, bis(hydroxyphenyl)cycloalkanes, such as, for example $C_5$–$C_6$-cycloalkylene and $C_5$–$C_6$-cycloalkylidene-bisphenols, and bis(hydroxyphenyl)sulfides, either ketones, sulfoxides or sulfones, furthermore α,α'-bis(hydroxyphenyl)-diisopropylbenzenes and the corresponding nuclear alkylated and nuclear halogenated compounds.

Further diphenols suitable for the preparation of polycarbonates are described in U.S. Pat. Nos. 3,028,265, 3,148,172, 2,991,273, 3,271,367, and 2,999,846, all incorporated herein by reference and German Offenlegungsschriften (German published specifications) Nos. 2,063,050 (Le A 13,359), 2,063,052 (Le A 13 425), 2,211,957 (Le A 14,240) and 2,211,956 (Le A 14 249). Suitable diphenols are e.g. 2,2-bis-(4-hydroxyphenyl)-propane, 2,2-bis-(4-hydroxy-3,5-dimethyl-phenyl-propane, bis-(4-hydroxyphenyl)-methane, bis-(4-hydroxy-3,5-dimethyl-phenyl)-methane, bis-(4-hydroxyphenyl)-sulphide and bis-(4-hydroxyphenyl)-sulfone.

The halogenated diphenols are also useful in the practice of the invention such as 2,2-bis-(3,5-dichloro-4-hydroxyphenyl)-propane; 2,2-bis-(3,5-dibromo-4-hydroxyphenyl)-propane; 2,2-bis-(3-chloro-4-hydroxyphenyl)-propane; 2-(3,5-dichloro-4-hydroxyphenyl)-2-(4-hydroxyphenyl)-propane; 2,2-bis-(3-chloro-5-methyl-4-hydroxyphenyl)-propane; 2,2-bis(3-brom-4-hydroxyphenyl)-propane and the like and are represented by the structural formula:

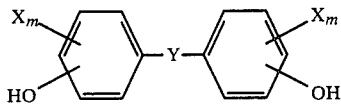

wherein Y is methylene or isopropylidene and X is halogen preferably chlorine or bromine and most preferably bromine and m is 1 to 4. These halogenated diphenols are preferably used as comonomers in amounts of up to 10 Mol % referred to the total molar amount of diphenols used.

Small amounts of trifunctional or more than trifunctional compounds can be reacted in the formation of the polycarbonate resins to branch the polymer chains, preferably between about 0.05 and 2.0 mol % (relative to diphenols employed), of trifunctional or more than trifunctional compounds, especially compounds with three or four phenolic hydroxyl groups.

Polycarbonates of this type are described for example in German Offenlegungsschriften (German Published Specifications) Nos. 1,570,533; 1,595,762; 2,116,974 and 2,113,347; British Patent Specification No. 1,079,821 and U.S. Pat. No. 3,544,514 (incorporated herein by reference).

Some of the examples of compounds with three or more than three phenolic hydroxyl groups which can be used are phloroglucinol; 4,6-dimethyl-2,4,6-tri-(4-hydroxyphenyl)-heptene-2, 4,6-dimethyl-2,4,6-tri-(4-hydroxyphenyl)-heptane; 1,4,5,-tri-(4-hydroxyphenyl)-benzene; 1,1,1,-tri-(4-hydroxyphenol)-ethane; tri-(4-hydroxyphenyl)-phenyl methane; 2,2-bis-(4,4-bis-(4-hydroxyphenyl)-cyclohexyl)-propane; 2,4-bis-(4-hydroxyphenyl-isopropyl)-phenyl; 2,6-bis-(2-hydroxy-5'-methylbenzyl)-4-methyl phenyl; 2-4(4-hydroxyphenyl)-2-(4-hydroxyphenyl)-propane; hexa-(4-(4-hydroxyphenylisopropyl)phenyl)orthoterephthalic acid ester; tetra-(4-hydroxyphenyl)-methane; tetra-(4-(4-hydroxyphenylisopropyl)-phenoxy)-methane; and 1,4-bis-(4',4''-dihydroxytriphenyl)-methyl-benzene. Some of the other trifunctional compounds are 2,4-dihydroxybenzoic acid, trimesic acid, cyanuric chloride 3,3-bis-(4-hydroxyphenyl)-2-oxo-2,3-dihydroindole and 3,3-bis-(4-hydroxy-3-methyl-phenyl)-2-oxo-2,3-dihydroindole.

The polycarbonates according to the instant invention can be isolated according to known methods for example by devolatolizing extrusion. They can be shaped in any articles e.g. via molding into test rods, molded specimen or films. They can be mixed up with stabilizers against heat, UV and moisture according conventional procedure. There can be added filler, pigments reinforcing agent like glass fibers as known for conventional polycarbonates.

EXAMPLES

The following examples are intended to illustrate the subject of the invention in more detail.

I

Comparision Examples

Polycarbonates with phenol as chain terminator

1. About 454 parts of 2,2-(4,4'-dihydroxydiphenyl)-propane and 6.20 parts of phenol are suspended in 1,5-liters of water. The oxygen is removed from the reaction mixture in a 3-necked flask, provided with a stirrer and gas inlet tube, by passing nitrogen through the reaction mixture for 15 minutes, while stirring 355 parts of 45% strength sodium hydroxide solution and 1,000 parts of methylene chloride are then added. The mixture is cooled to 25° C. While maintaining this temperature by cooling 237 parts of phosgene are added over a period of 120 minutes. An additional amount of a 45% strength sodium hydroxide solution of 75 parts is added after 15–30 minutes or after the absorption of phosgene has started.

1.6 parts of triethylamine are added to the solution formed and the mixture is stirred for a further 15 minutes. A highly viscous solution is obtained, the viscosity of which is regulated by adding methylene chloride. The aqueous phase is separated off. The organic phase is washed with water until free from salts and alkali. The polycarbonate is isolated from the washed solution and dried. The polycarbonate has a relative viscosity of 1.30 measured in a 0.5% strength solution of methylene chloride at 25° C. This approximately corresponds to a weight average molecular weight of about 32,000. The polycarbonate thus obtained is extruded and granulated.

2. An aromatic polycarbonate based on 94.9 mol % of Bisphenol A and 5.1 mol % of 2,2-(4,4'-dihydroxy 3,3',5,5'-tetrabromo diphenyl) propane (tetrabromobisphenol A) with a relative viscosity of $\eta_{rel}$ 1,27 prepared according to example 1.

3. Branched polycarbonate based on 99.50 mol % Bisphenol A and 0.5 mol % of isantinbiscresol with a relative viscosity of $\eta_{rel}$ 1.30 was prepared according to example 1.

II

The Polycarbonates according to the invention

4. A solution is prepared from 3,192 kg of 2,2-bis-(4-hydroxyphenyl)-propane (bisphenol A) (14 mols) 2,53 kg of 45% strength aqueous sodium hydroxide solution and 15 liters of distilled water. After adding 34 kg of methylene chloride, 127 g of benzene sulfonanilide (3,9 mol %) dissolved in 1 kg of methylene chloride are added at room temperature, while stirring 2,84 kg of phosgene is passed in at 20°-25° C. The pH-value is kept at 13-14 during the phosgenation by adding a further 26,3 kg of 6.5% strength sodium hydroxide solution. 15 ml of triethylamine are then added and the mixture is further stirred for 30 minutes. The upper aqueous phase is then separated off and the organic phase is acidified and washed until free from electrolytes. The methylene chloride is then evaporated off and the polycarbonate is dried at 110° C. for 8 hours. The relative viscosity $\eta_{rel}$ 1,26.

5. A polycarbonate based on bisphenol A prepared according to example 4 using 3,9 mol % of compound A (see table I) and with a relative viscosity of 1.32.

6. A polycarbonate based on bisphenol A prepared according to example 4 using 3.9 mol % of compound B (see table I) with a relative viscosity of 1,274.

7. An aromatic polycarbonate based on 94.9 mol % of bisphenol A and 5.1 mol % of 2,2-(4,4-dihydroxy-3,3'-5,5'-tetrabromo diphenyl)-propane (Tetrabromobisphenol A). With benzene sulfonanilide 3 mol % as chain terminator with a relative viscosity $\eta_{rel}$ 1,268.

8. Branched polycarbonate based on 99.50 mol % bis-phenol A and 0.5 mol % of 3,3-bis-(4-hydroxy-3-methylphenyl)-2-oxo-2,3-dihydroindole, with benzenesulfonanilide (4.2 mol %) as chain terminator with relative viscosity of $\eta_{rel}$ 1,25.

TABLE I

| Polycarbonate from example | Burning characteristics according to Underwriters Laboratories Bull. 94/ Thickness of Test specimen | | $\eta_{rel}$ | Tg, °C. |
|---|---|---|---|---|
| | 3.2 mm | 1.6 mm | | |
| 1 | V-2 | V-2 | 1,30 | 150 |
| 2 | V-0 | V-2 | 1,30 | 158 |
| 3 | V-2 | V-2 | 1,296 | 153 |
| 4 | V-0 | V-1 | 1,26 | 154 |
| 5 A | | V-1 | 1,32 | 149 |
| 6 B | | V-1 | 1,27 | 150 |
| 7 | V-0 | V-0 | 1,27 | 158 |
| 8 | V-0 | V-0 | 1,25 | 153 |

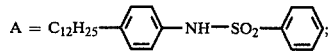

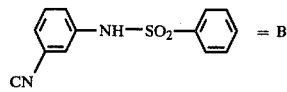

The burning characteristics according to UL Bulletin 94 thickness of test specimen 3.2 mm and 1.6 mm were determined on tempered specimens (130° C., 2 days).

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. In the interfacial process for the preparation of an aromatic polycarbonate resin having a weight average molecular weight of between 10,000 and 100,000 as determined from the relative viscosity measured in $CH_2Cl_2$ at 25° C. at a concentration of about 0.5% by weight from at least one diphenol and a carbonic acid derivative the improvement comprising coreacting an aromatic sulfonanilide as a chain stopper in an amount of from 2 mol % to 20 mol % relative to the number of mols of said diphenol.

2. The process of claim 1 wherein the amount of aromatic sulfonanilide is about 2.5 mol % to 10 mol %.

3. The process according to claim 1, wherein said diphenol is halogen free.

4. The process according to claim 1 wherein said at least one diphenol comprises at least one halogenated diphenol.

5. The process according to claim 1 further comprising coreacting a branching agent.

6. The process according to claim 1, wherein the aromatic sulfonanilide has the general formula (I)

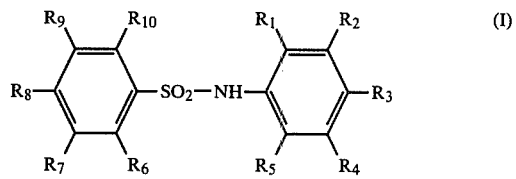

wherein $R_1$ to $R_{10}$ are identical or different and are H, alkyl, cycloalkyl, aryl, cyano or halogen.

7. The aromatic polycarbonate produced by the process according claim 1.

8. An aromatic polycarbonate prepared by the process of claim 1 and characterized by the general formula (II)

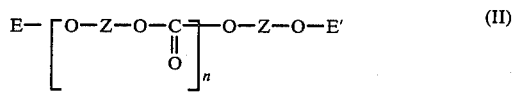

wherein E and E' are the same or different and are radicals of formula (III)

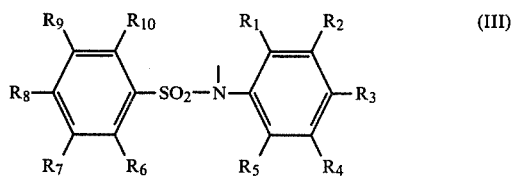

wherein $R_1$ to $R_{10}$ are identical or different and are H, $C_1$-$C_{18}$ alkyl, $C_5$-$C_6$ cycloalkyl, $C_6$-$C_{16}$ aryl, cyano or halogen, wherein Z represents a divalent aromatic diradical derived from a compound of the formula (IV)

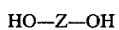

and n is the degree of polymerisation which results from a weight average molecular weight, of the aromatic polycarbonate of from about 10,000 to 100,000.

* * * * *